(12) United States Patent
Ohuchi et al.

(10) Patent No.: US 8,590,403 B2
(45) Date of Patent: *Nov. 26, 2013

(54) INERTIAL FORCE SENSOR

(75) Inventors: Satoshi Ohuchi, Hyogo (JP); Hiroyuki Aizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,943

(22) Filed: Jun. 8, 2012

(65) Prior Publication Data

US 2012/0240678 A1   Sep. 27, 2012

Related U.S. Application Data

(63) Continuation of application No. 12/296,273, filed as application No. PCT/JP2007/057871 on Apr. 10, 2007, now Pat. No. 8,215,190.

(30) Foreign Application Priority Data

Apr. 12, 2006   (JP) ................................. 2006-109507

(51) Int. Cl.
  *G01L 1/10* (2006.01)
(52) U.S. Cl.
  USPC ...................................... 73/862.59
(58) Field of Classification Search
  USPC ...................................... 73/862.59
  See application file for complete search history.

(56) References Cited

U.S. PATENT DOCUMENTS

| | | | |
|---|---|---|---|
| 3,697,766 A * | 10/1972 | Ganter et al. | ............ 310/348 |
| 5,386,726 A | 2/1995 | Terajima | |
| 5,644,273 A | 7/1997 | Kaida et al. | |
| 5,939,631 A | 8/1999 | Moore | |
| 6,018,997 A | 2/2000 | Kumada et al. | |
| 6,293,585 B1 | 9/2001 | Bruns et al. | |
| 6,388,535 B1 | 5/2002 | Otsuki et al. | |
| 6,415,643 B2 | 7/2002 | Watarai | |
| 6,666,091 B2 | 12/2003 | Hatanaka et al. | |
| 6,799,461 B2 | 10/2004 | Fujimoto et al. | |
| 6,931,927 B2 | 8/2005 | Ohta et al. | |
| 6,949,870 B2 | 9/2005 | Ono et al. | |
| 7,107,843 B2 | 9/2006 | Ohuchi et al. | |
| 7,411,649 B2 | 8/2008 | Umetsu | |
| 7,441,316 B2 * | 10/2008 | Kawashima | .............. 29/25.35 |
| 7,521,846 B2 * | 4/2009 | Tanaya | ................ 310/370 |
| 7,973,458 B2 * | 7/2011 | Iwai | ................ 310/370 |
| 2004/0085163 A1 | 5/2004 | Kikushima | |

FOREIGN PATENT DOCUMENTS

| | | |
|---|---|---|
| EP | 1445579 A2 | 8/2004 |
| JP | 53-79398 | 7/1978 |
| JP | 10-163779 | 6/1998 |
| JP | 10-163779 A | 6/1998 |

(Continued)

OTHER PUBLICATIONS

International Search Report for PCT/JP2007-057871; Jun. 7, 2007.

(Continued)

*Primary Examiner* — Lisa Caputo
*Assistant Examiner* — Octavia Davis-Hollington
(74) *Attorney, Agent, or Firm* — Pearne & Gordon LLP

(57) ABSTRACT

An inertial force sensor is composed of a plurality of arms and an oscillator having a base for linking the arms, in which a trimming slit is formed on a part of the arm except for a ridge portion, thus controlling damage to a tuning fork arm to be caused by the trimming.

6 Claims, 6 Drawing Sheets

(56) References Cited

FOREIGN PATENT DOCUMENTS

| | | |
|---|---|---|
| JP | 2004-61486 A | 2/2004 |
| JP | 2004-93158 | 3/2004 |
| JP | 2005-201652 A | 7/2005 |
| JP | 2005-345404 | 12/2005 |
| WO | 03/014667 A1 | 2/2003 |

OTHER PUBLICATIONS

International Search Report for Appl. No. EP 07741307 dated Mar. 8, 2010.
Japanese Office Action No. 2006-109507 dated Apr. 26, 2011.
Japanese Office Action No. 2011-071617 dated Apr. 26, 2011.
Report of Research Product by subsidy of The Japanese Ministry of Education; Mar. 1987, pp. 39-41.

* cited by examiner

INERTIAL FORCE SENSOR

This application is a continuation of U.S. patent application Ser. No. 12/296,273 filed on Oct. 6, 2008, which is incorporated herein by reference in its entirety.

TECHNICAL FIELD

This invention relates to an inertial force sensor for detecting an inertial force of various electronic devices, such as a posture controller and a navigator of an aircraft, an automobile, a robot, a vessel, and a vehicle.

BACKGROUND ART

Below, a conventional inertial force sensor is explained with reference to a drawing.

FIG. 8 is a perspective view of an oscillator used for a conventional inertial force sensor. In FIG. 8, the conventional inertial force sensor is a piezoelectric transducer type sensor composed of oscillator 1 and a circuit for detecting an inertia force on a basis of signal from oscillator 1. The oscillator 1 includes two tuning fork arms 2 and 3 facing each other and base 4 linking two tuning fork arms 2 and 3. For a convenience of explanation, x, y and z axes mutually crossing at right angles are shown in FIG. 8. Tuning fork arms 2 and 3 are designed to be oscillated in the x-axis direction. For tuning fork arms 2 and 3 to oscillate ideally in the x-axis direction, a cross section of each arm is desirably formed in a rectangular shape so that they constitute a detailed and accurate symmetry with regard to x-axis and z-axis. However, due to a variation on work process in producing oscillator 1, it is extremely hard to produce the arm precisely in a rectangular shape. For this reason, when the element is oscillated, an unwanted vibration signal is generated and superimposed on a principal oscillation in the x-axis direction.

In order to solve the problem, after oscillator 1 is finished, trimming slit 8 is formed on tuning fork arm 2 and 3 by radiating a laser on each of the arm and melt-removing a part of oscillator 1. A mass balance between arm 2 and 3 being adjusted in this manner, the element oscillates properly in the x-axis direction. In this arrangement, the trimming slit is formed on ridge portion 7 where melt-removing is easy. As prior art documental information relating to an application of this invention, Unexamined Japanese Patent Publication No. 2004-93158 is publicly known, for instance. However, in this conventional method, a work affected layer is possibly formed near trimming slit 8 of tuning fork arm 2 and 3 due to processing heat, dropping strength of base material and damaging tuning fork arm 2 and 3 or generating an undesired oscillation.

SUMMARY OF THE INVENTION

This invention is to solve above mentioned problem and provide an inertial force sensor, in which a trimming slit is formed on a part of the sensor except for a ridge portion, hardly causing damage to a tuning fork arm with the trimming.

Figure 1:
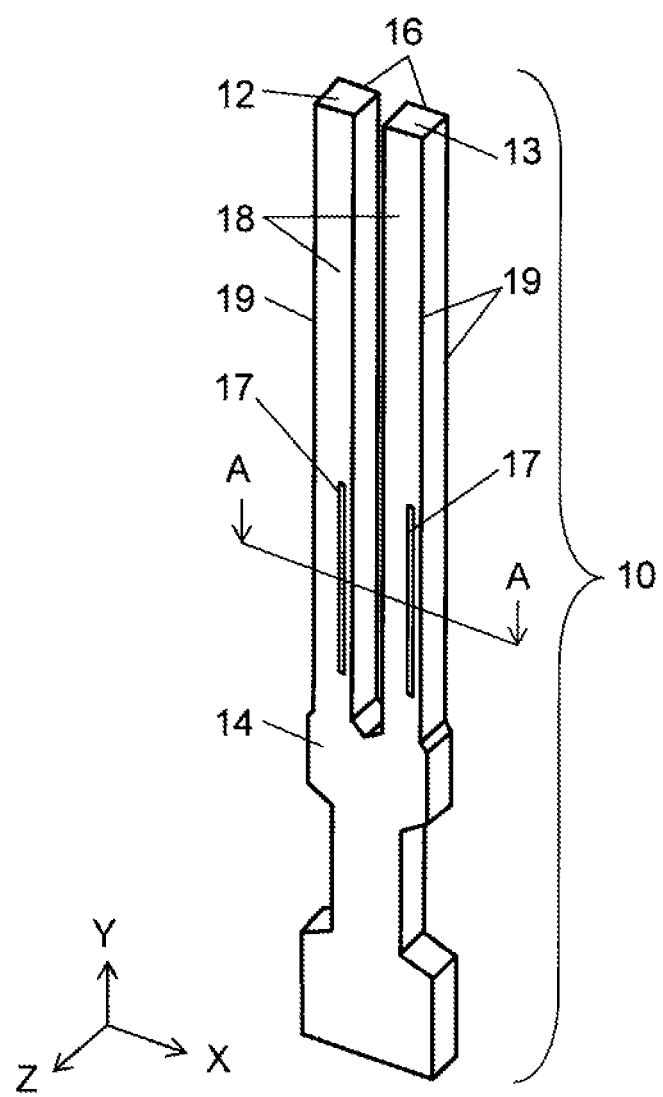
FIG. 1 is a perspective view of an oscillator to be used for an inertial force sensor according to an embodiment of the invention.

REFERENCE MARKS IN THE DRAWINGS 10. oscillator
12. tuning fork arm
13. tuning fork arm
14. base
15. electrode
16. electrode plane
17. trimming slit
18. trimming plane
19. ridge portion

DETAILED DESCRIPTION OF THE PREFERRED EMBODIMENTS

Following, an inertial force sensor in accordance with an embodiment of the invention is explained with reference to the drawings. For the same constitutional member appearing in a different drawing, one numerical reference is assigned.

Figure 2:
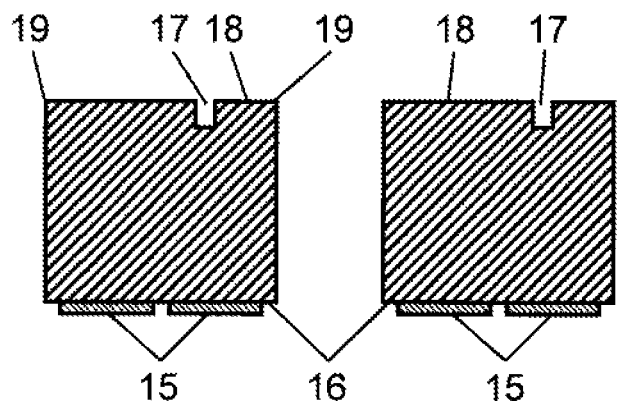
FIG. 2 is a cross sectional view of the oscillator taken along a line A to A.

FIG. 1 is a perspective view of an oscillator to be used for an inertial force sensor according to an embodiment of the invention. FIG. 2 is a cross sectional view of the oscillator taken along a line A to A.

As shown in FIGS. 1 and 2, the inertial force sensor according to an embodiment of the invention includes a tuning fork type oscillator 10 for detecting an inertia force, and a processing circuit (not illustrated). Oscillator 10 is composed of two tuning fork arms 12 and 13 and base 14 linking the fork arms. One side of tuning fork arm 12 and 13 is electrode plane 16 formed with electrode 15 and an other or a rear side of the plane is trimming plane 18 formed with trimming slit 17.

Oscillator 10 is made of silicone (Si). Electrode 15 formed on arm 12 and 13 is a piezoelectric thin film of lead-zirconate titanate (PZT) deposited with Au/Ti, Pt/Ti or the like on an upper and a lower sides of the film.

When an alternating current is applied to two electrodes 15 for each electrode receiving a mutually reversed phase, oscillator 10 is driven to be oscillated in a lateral direction of tuning fork arm 12 and 13 (the x-axis direction shown in FIG. 1). At this time, if cross-sectional figures of tuning fork arm 12 and 13 are symmetrical with regard to the x-axis and the z-axis, tuning fork arms 12 and 13 oscillate in the x-axis direction without warping in the z-axis direction. If the symmetry is broken, the arms are warped in the z-axis direction (undesired oscillation) while oscillating in the x-axis direction.

When oscillator 10 warps in the z-axis direction, an electric charge (unwanted signal) is generated at an angular velocity detection electrode (not illustrated). If phase of the unwanted signal is shifted by 90° from an electric charge generated when angular velocity for a detection signal is input, the unwanted signal can be removed by conducting a synchronous detection process in the processing circuit. However, if the phase of reference synchronous detection signal and the unwanted signal is shifted even slightly other than 90°, an angular velocity signal is warningly output. For this reason, oscillator 10 is required not to emit an unwanted signal. However, as explained in the background art, it is very hard to finish the cross sectional part of tuning fork arm 12 and 13 having a detailed and accurate symmetry with regard to the x-axis and z-axis directions. For this reason, after oscillator 10 is finished, it becomes necessary to trim tuning fork arms 12 and 13 mechanically to minimize emission of the unwanted signal. Thus, the mass balance is secured and the timing fork driving signal is stabilized.

Figure 3:
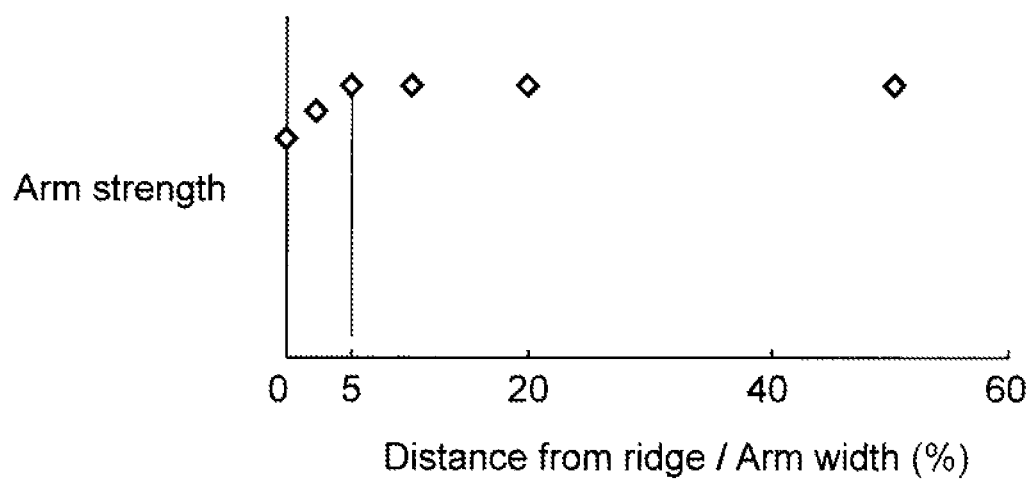
FIG. 3 is a characteristic diagram showing a relation between a forming position of a trimming slit with regard to an arm width and strength of the arm.

A most effective part for trimming is ridge portion 19, a base part of tuning fork arm 12 and 13 (near base 14). However, if the ridge portion is trimmed, tuning fork arm 12 and 13 loses its strength. FIG. 3 is a characteristic diagram showing a relation between a forming position of a trimming slit with regard to an arm width and strength of the arm. In FIG. 3, strength of an arm trimmed at the ridge portion is shown at a point of 0% distance from the ridge portion with regard to the arm width. It is presumed that heat generated by trimming work produces a work-affected layer near trimming slit 17, deteriorating strength of the base material.

When trimming is formed on a plane away from the ridge portion, the arm strength is raised as the distance is increased, as is shown in FIG. 3. The arm strength simply increases up to a distance 5% from the ridge portion with regard to the arm width. When the distance from the ridge portion with regard to the arm width exceeds 5%, the strength is stabilized to almost a constant value. This constant value is nearly equal to a strength in which no trimming slit 17 is formed. Namely, if slit 17 is formed within at least 5% distance from ridge portion 19 and at most 95% distance to an other ridge portion, tuning fork arm 12 and 13 is trimmed without losing almost any strength for being oscillated in due direction.

Figure 4:
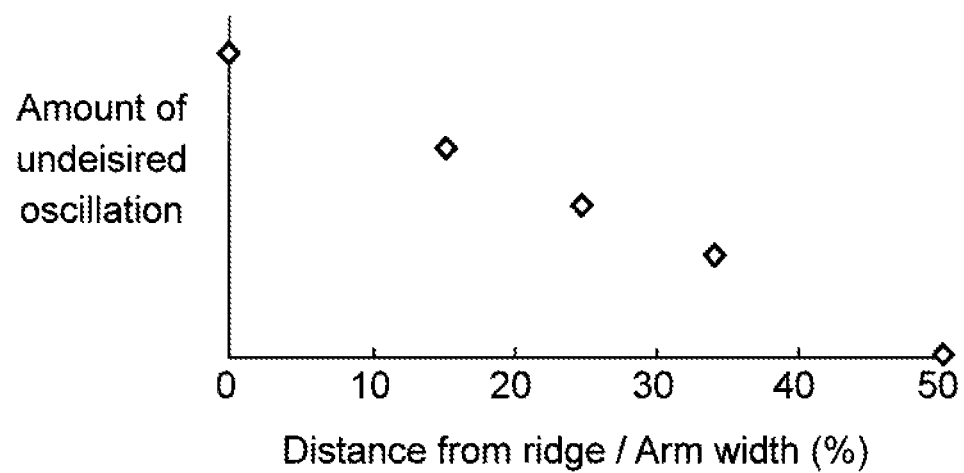
FIG. 4 is a characteristic diagram showing a relation between a forming position of a trimming slit and an amount of undesired oscillation.
Figure 5:
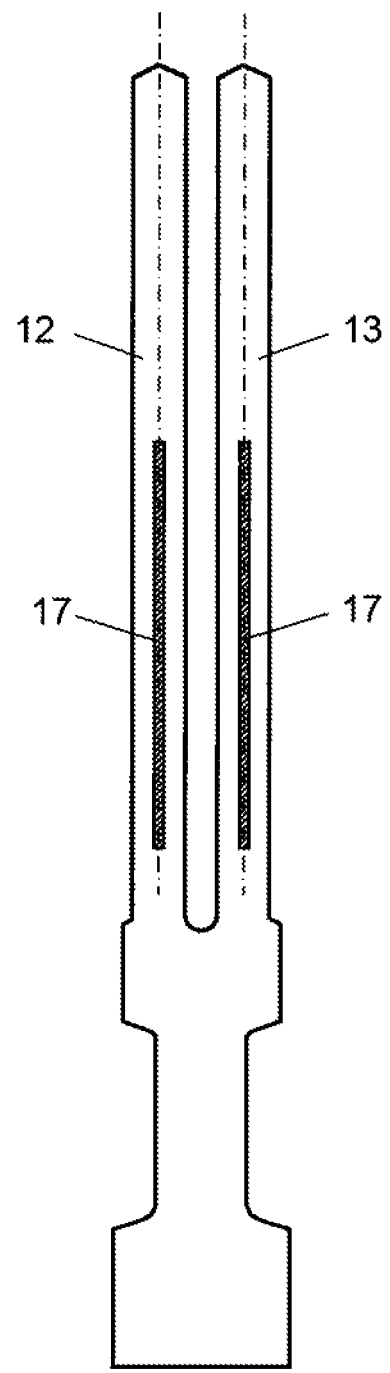
FIG. 5 is a front view of an oscillator in which a trimming slit is formed in a center of the arm width.
Figure 7:
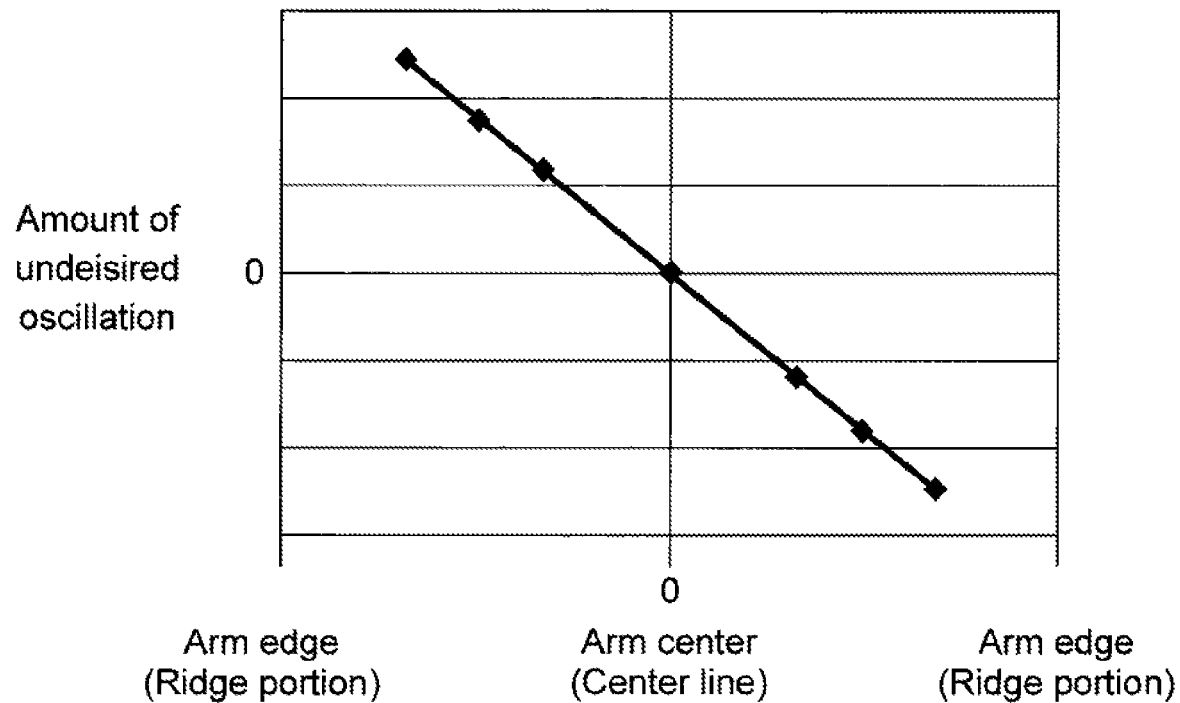
FIG. 7 is another characteristic diagrams showing a relation between a forming position of a trimming slit and an amount of undesired oscillation.
Figure 8:
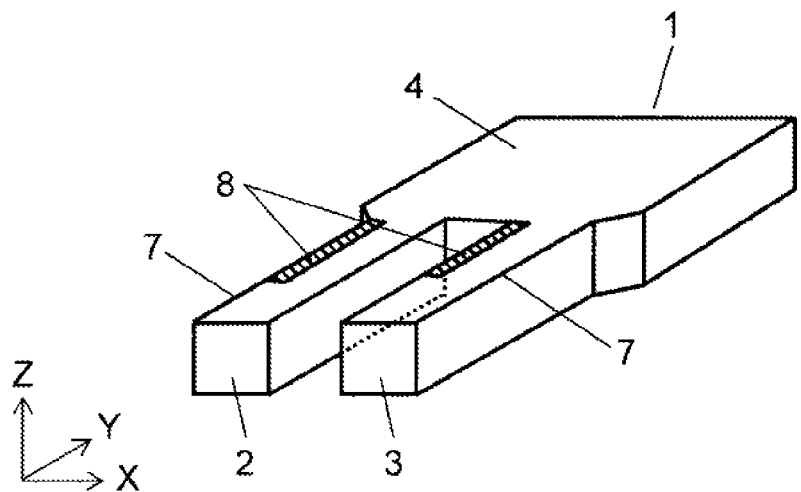
FIG. 8 is a perspective view of an oscillator to be used for a conventional inertial force sensor.

FIG. 4 and FIG. 7 are characteristic diagrams showing a relation between a forming position of a trimming slit and an amount of undesired oscillation. As indicated by FIG. 4, as long as a longitudinal length and a width of trimming slit in tuning fork arm 12 and 13 are fixed, there is a linear correlation noticed between a forming position of trimming slit 17 with regard to the width and a changing amount of an unneeded signal. FIG. 4 indicates no undesired oscillation is generated when the trimming slit is formed at a distance of 50% from the ridge portion with regard to arm width of tuning fork arm 12 and 13, meaning no undesired oscillation is generated when the trimming slit is formed in a center of the plain part of the arm. FIG. 5 is a front view of an oscillator showing that a trimming slit is formed in a center of the plane portion in the arm width. With the trimming position in FIG. 5, no undesired oscillation is generated.

Figure 6A:
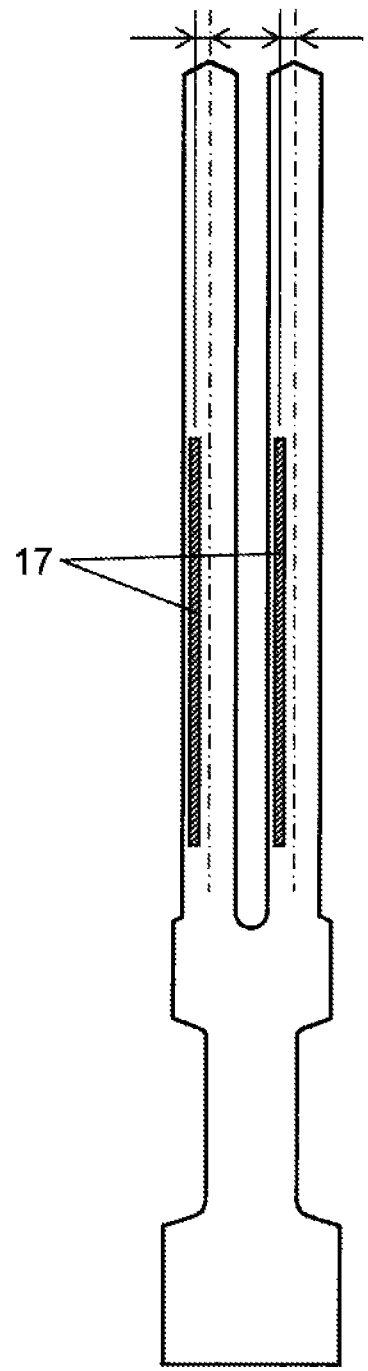
FIG. 6A is a front views of an oscillator in which a trimming slit is formed shifted from a center of the arm width.
Figure 6B:
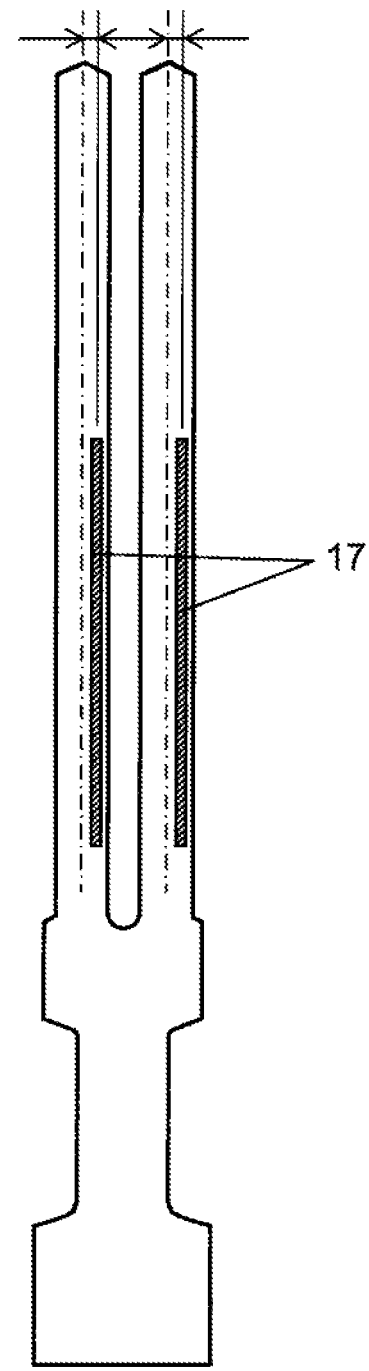
FIG. 6B is another front views of an oscillator in which a trimming slit is formed shifted from a center of the arm width.

FIG. 6A and FIG. 6B are front views of an oscillator in which the trimming slit is formed shifted from the center of the arm width. When the forming position of trimming slit 17 is shifted from the center of the plain part of tuning fork arm 12 and 13 to a ridge portion, an amount of undesired oscillation linearly changes corresponding to the shifted amount of the trimming slit, as it is shown in FIG. 7. It means that generation of the unwanted signal can be controlled by properly fixing a forming position of trimming slit 17 with reference to the center of the arm width of tuning fork 12 and 13 and in accordance with a changing amount of the unwanted signal having a linear correlation with the forming position, namely by securing a mass balance between the two arms. As in above, the unwanted signal is easily removed by adjusting the forming position of trimming slit 17 on tuning fork arm 12 and 13 laterally corresponding to the amount of the unwanted signal.

Trimming is preferably made on an other side or a rear side of tuning fork arm 12 and 13 where electrode 15 is formed. The reason being, if electrode plane 16 having electrode 15 is chosen for trimming, a working area has to be limited due to a forming patter of electrode 15, unable to work at a desirable portion. Moreover, the laser heat possibly damages performance of PZT which constitutes electrode 15.

Laser is used because a highly accurate finish is expected and an amount of melted residue caused by the processing is reduced. The amount of melted residue caused by laser radiation is reduced specifically by using a wavelength of 355 nm. By shortening the wave length, generation of the melted residue is further reduced. As the wave length becomes shorter, the higher becomes an accuracy of finish. However, as the wave length becomes shorter, the cost of the production instrument becomes higher. In considering the cost of the instrument and stability of work-process, 355 nm is presently preferable.

Trimming slits 17 are preferably formed at an identical part of tuning fork arm 12 and 13. It is possible to reduce generation of the unwanted tuning signal by trimming only one of tuning fork arm 12 and 13, but when the trimming amount (change in mass balance) is large, mass of the right and left arm becomes unbalanced. So, even if an unwanted tuning signal is reduced in an initial characteristic, there still remains a possibility that output variance becomes large when temperature characteristics are taken into account. Therefore, it is desirable to trim both arms evenly.

In the explanation of this exemplary embodiment, oscillator 10 is individually trimmed. However, multiple elements can be laser-trimmed in a wafer state, in which oscillator 10 is individually measured for an unwanted signal level and then a position of trimming slit 17 is determined for each element according to the detected level of the unwanted signal. By trimming the elements collectively in a wafer state, rinsing after trimming becomes easy, and work residue caused by the trimming process is readily removed. If trimming work is made after an oscillator and an IC are assembled, there is a possibility work residue get into a package during the trimming process, but if trimming is made in the wafer state, such a fault is avoided to occur.

In this exemplary embodiment of the invention, the constitutional body of oscillator 10 is made of silicon (Si) because it is mechanically strong and a semiconductor processing technology is easily applicable to the material for achieving a high precision work. However, the constitutional body can be made of surface oxidized Si, diamond, melted quartz, alumina, and GaA or the like as long as it is a non-piezoelectric material.

INDUSTRIAL APPLICABILITY

With the inertial force sensor of this invention, damage to a tuning fork arm caused by trimming is prevented. The sensor is highly durable and precise and is applicable to a variety of electronic equipment.

The invention claimed is:

1. An inertial force sensor comprising an oscillator, the oscillator having:
   arms made of a non-piezoelectric material;
   a base linking the arms; and
   an electrode formed on a side of each of the arms, wherein each of the arms is provided with a trimmed portion formed at a portion away from a ridge portion of the arm, between 5% and 95% width of a plane part of the arm, and located at an identically corresponding position in each of the arms.

2. The inertial force sensor of claim 1,
wherein a mass of each of the arms is equal to a mass of each of the other arms.

3. The inertial force sensor of claim 1,
wherein the trimmed portion is formed by a laser processing.

4. The inertial force sensor of claim 3,
wherein a wavelength of the laser is at most 355 nm.

5. The inertial force sensor of claim 1,
wherein the trimmed portion extends in parallel with the ridge portion of the arm.

6. The inertial force sensor of claim 1,
wherein each trimmed portion has a same length and a same width, and each trimmed portion is formed in a respective one of the arms at a position with respect to a center line in a width direction of each of the arms, where mass of the arms is balanced.

* * * * *